United States Patent [19]

Tanaka et al.

[11] 4,292,049
[45] Sep. 29, 1981

[54] CERAMIC MATERIALS FOR HIGH-SPEED CUTTING

[75] Inventors: Hiroshi Tanaka; Osamu Kato, both of Nagoya, Japan

[73] Assignee: NGK Spark Plug Co., Ltd., Nagoya, Japan

[21] Appl. No.: 153,291

[22] Filed: May 27, 1980

[30] Foreign Application Priority Data

May 25, 1979 [JP] Japan .................................. 54-65476

[51] Int. Cl.$^3$ ............................................. C04B 35/10
[52] U.S. Cl. ..................................... 51/309; 501/105; 501/153
[58] Field of Search .................... 106/73.4, 57; 51/309

[56] References Cited

U.S. PATENT DOCUMENTS

| | | | |
|---|---|---|---|
| 3,862,846 | 1/1975 | Smoak et al. | 106/73.4 |
| 3,871,891 | 3/1975 | Schuller et al. | 51/309 |

*Primary Examiner*—O. R. Vertiz
*Assistant Examiner*—Mark Bell
*Attorney, Agent, or Firm*—Sughrue, Mion, Zinn, Macpeak and Seas

[57] ABSTRACT

Ceramic materials for use in high-speed cutting, comprising $Al_2O_3$, $ZrO_2$ and at least one alkali earth oxide selected from CaO and MgO, the weight ratio of $Al_2O_3/ZrO_2$ is in the range from about 95/5 to 99.5/0.5, the molar ratio of $(CaO+MgO)/ZrO_2$ is in the range from about 0.05/1 to 0.2/1, and at least 50% of the $ZrO_2$ in the material is cubic $ZrO_2$, and the remainder is monoclinic $ZrO_2$.

4 Claims, No Drawings

CERAMIC MATERIALS FOR HIGH-SPEED CUTTING

BACKGROUND OF THE INVENTION

1. Field of the Invention

This invention relates to ceramic materials useful for ceramic tools comprising mainly alumina, and more particularly to improved ceramic materials which can be safely used for high-speed cutting.

2. Description of the Prior Art

The use of $Al_2O_3$ in combination with small amounts of CaO, MgO and $Y_2O_3$ has hitherto been known, and such compositions have widely been used for the production of abrasion resistant, dielectric and heat resistant porcelains. However, ceramic materials produced from such compositions, when used as cutting tools, have suffered from the disadvantage that they are liable to break, particularly in high-speed cutting applications, since parts of the cutting edge may rise in temperature to as high as 1,400° C., resulting in mechanical stress and breakage. In the art of cutting, therefore, it has been difficult for such ceramic materials to find applications other than finish cutting.

To solve the problem as described above, improved ceramic materials have been proposed, including ceramic materials containing 10 to 30% carbides, (e.g., TiC) nitrides, and borides, and molding the resulting mixtures by a hot-press processing. Although these ceramic tools are durable for certain heavy-duty cutting, they are, when used in high-speed cutting, inferior in abrasion resistance, because of oxidation of the added carbides, nitrides, and borides.

Therefore, it has long been desired to obtain improved ceramic materials having improved high-speed cutting properties.

SUMMARY OF THE INVENTION

An object of this invention is to provide improved ceramic materials which can stably be used in high-speed cutting.

This invention, therefore, provides ceramic materials for use in high-speed cutting which comprise $Al_2O_3$, $ZrO_2$ and at least one alkaline earth metal oxide selected from CaO and MgO, wherein the weight ratio of $Al_2O_3/ZrO_2$ is in the range from about 95/5 to 99.5/0.5, the molar ratio of $(CaO+MgO)/ZrO_2$ is in the range from about 0.05/1 to 0.2/1.

DETAILED DESCRIPTION OF THE INVENTION

The ceramic material of this invention includes sintered bodies in which at least 50% of the $ZrO_2$ is cubic $ZrO_2$ and the remainder is low temperature type monoclinic $ZrO_2$.

The examples described below confirm that $ZrO_2$, CaO and MgO greatly control the grain growth of the $Al_2O_3$, thus permitting the formation of $Al_2O_3$ sintered bodies having a minute and fine crystal structure. Even if the temperature of the material rises to high levels during high-speed cutting, the abrasion resulting from oxidation as in the case of prior art materials does not take place; that is, the materials of the invention consists only of oxides having excellent cutting properties in the first place, and are not subject to deterioration by oxidation.

The weight ratio of $Al_2O_3/ZrO_2$ should be in the range of from about 95/5 to 99.5/0.5; that is, the amount of $ZrO_2$ added should be in the range of 0.5 to 5% by weight based on the total weight of $Al_2O_3$ and $ZrO_2$. When $ZrO_2$ is added in lesser amounts, the effect of controlling the grain growth is reduced and $Al_2O_3$ crystals exceeding $10\mu$ are formed in the system. As a result, the strength of the material is reduced, the abrasion of the material during cutting is increased, and in particular, a great size of abrasion traces is formed in the boundary area of the relief surface. On the other hand, if $ZrO_2$ is added in amounts greater than 5% by weight, as can be seen from the results of the examples described below, the hardness is reduced, the abrasion during cutting is increased, and the expected life of the material is shortened.

Particularly preferably, the weight ratio of $Al_2O_3/ZrO_2$ is in the range of from 97/3 to 98/2.

The molar ratio of $CaO/ZrO_2$ should be in the range of from about 0.05/1 to 0.2/1; that is, the amount of CaO added should be from about 5 to 20 mole % of $ZrO_2$. Since $ZrO_2$ exhibits a monoclinic system at room temperature, and a tetragonal system at more than 1,100° C., where the surface temperature of the cutting edge in use rises to 1,400° C., as in high-speed cutting tools, and hovers in the vicinity of the transition temperature of the crystal system, a volume change of about 9% is caused, resulting in the occurrence of local stress in the surface layer of the cutting edge and in a volume change due to heat expansion. This results in the formation of cracks in the cutting edge and the breakage thereof. The addition of CaO in an amount of from about 10 to 15 mole %, based on the $ZrO_2$, allows the $ZrO_2$ provide a cubic system at 1,200° C. or more, and provides stabilized $ZrO_2$, the crystal structure of which will continue to exist even when cooled to room temperature. According to the experimental results, when such stabilized $ZrO_2$ constitutes one-half or more of the $ZrO_2$ component, the cutting edge of a ceramic material thus obtained is free from cracks and excellent in high-speed cutting. In this case, the amount of CaO is at least 5 mole % based on $ZrO_2$. However, when the amount of CaO exceeds 20 mole %, CaO and $Al_2O_3$ react, precipitating prismatic calcium aluminate, and these crystals grow easily, reducing the strength of ceramic tools.

For the same reasons as described above, the amount of MgO should be in the range of 5 to 20 mole% based on $ZrO_2$.

Particularly preferably, the molar ratio of $(CaO+MgO)/ZrO_2$ is in the range of from 0.08/1 to 0.1/1.

Of those alkaline earth metal oxide such as CaO and MgO, CaO is preferably preferred.

The following examples are given to illustrate this invention in greater detail.

EXAMPLE 1

$Al_2O_3$, $ZrO_2$, CaO and MgO having the characteristics as illustrated in Table 1 used in the relative molar amounts indicated in Table 2 were placed in a porcelain ball mill and wet-mixed for 20 hours. To this mixture was added 1% of PVA as a press binder, which was then dried. The resulting dry mass was press-molded at a pressure of 1,500 kg/cm² and after removing the press binder in a heating oven, was sintered in an electric furnace at 1,580° C. for 1 hour.

This mass was then worked with a diamond grinder to produce SNG 432 (12.7 mm×12.7 mm×4.8 mm; corner R: 0.8 mm; cutting edge chamfer: 0.05 mm).

After measurement of density and hardness, cutting capabilities were examined under the following conditions:

Cutting Speed: V=920 m/min.
Depth of Cut: t=1.0 mm
Feed: f=0.25 mm/rev.
Material to be cut: The outer surface of a disc made of gray cast iron according to JIS FC 20 (outer diameter: 250 mm; inner diameter: 100 mm; length: 15 mm) was cut.

The results are shown in Table 2.

TABLE 1

| Component | Average Particle Size (μ) | Purity (%) |
| --- | --- | --- |
| $Al_2O_3$ | 0.5 | 99.9 |
| $ZrO_2$ | 1.4 | 99.5 |
| $CaCO_3$ | 1.0 | 99.9 |
| $MgCO_3$ | 1.0 | 99.9 |

TABLE 2

| Run No. | $Al_2O_3$ | $ZrO_2$ | CaO | MgO | Relative Density (%) | Hardness (45N) | Flank Wear Width after Cutting of 200 Discs (mm) |
| --- | --- | --- | --- | --- | --- | --- | --- |
| No. 1 R | 99.5 | 0.0 | 0.0 | 0.5 | 99.2 | 86.2 | Broken by chipping |
| No. 2 R | 99.7 | 0.3 | 0.02 | 0.0 | 99.1 | 87.2 | 0.30 |
| No. 3 | 99.5 | 0.5 | 0.03 | 0.0 | 99.3 | 87.5 | 0.28 |
| No. 4 | 99.0 | 1.0 | 0.05 | 0.0 | 99.3 | 87.5 | 0.24 |
| No. 5 | 97.0 | 3.0 | 0.15 | 0.0 | 99.4 | 87.6 | 0.20 |
| No. 6 | 97.0 | 3.0 | 0.16 | 0.06 | 99.5 | 87.8 | 0.19 |
| No. 7 | 95.0 | 5.0 | 0.25 | 0.0 | 99.2 | 87.0 | 0.23 |
| No. 8 R | 93.0 | 7.0 | 0.35 | 0.0 | 98.9 | 85.9 | 0.48 |

From the results as illustrated in Table 2, it can readily be seen that No. 1 R wherein no $ZrO_2$ is added is inferior in toughness, resulting in the breakage of the cutting edge. No. 2 R and No. 8 R, wherein the amounts of $ZrO_2$ added are respectively lesser and greater than the defined range, show large abrasion. In contrast, Nos. 3 through 7, wherein the amounts of $ZrO_2$ and MgO added fall within the range of this invention, are free from chipping, exhibit 0.28 mm or less wear width, and are useful ceramic materials for high-speed cutting.

EXAMPLE 2

Powders having the same compositions as those of Nos. 5 and 6 were each introduced into a graphite mold, hot-pressed at 1,600° C. for 10 minutes by a conventional method, taken out of the mold and then worked into the same shape as in Example 1. For comparison, a chip of high purity $Al_2O_3$ produced by hot-pressing (referred to as C-HP in Table 3), which is available on the market, was employed.

With these materials, the side of a disc with an outer diameter of 250 mm and an inner diameter of 150 mm was cut under the following conditions:

Cutting Speed: (part of maximum outer diameter) v=600 m/min.
Depth of Cut: t=1.5 mm
Feed: f=0.2 mm/rev.
Material to be cut: The outer surface of a disc made of gray cast iron according to JIS FC 20 (outer diameter: 250 mm; inner diameter: 100 mm; length: 15 mm) was cut.

The results are shown in Table 3.

TABLE 3

| Run No. | Relative Density (%) | Hardness (45N) | Number of Discs which can be cut |
| --- | --- | --- | --- |
| No. 5 H | 99.9 | 88.3 | 120 |
| No. 6 H | 99.9 | 88.5 | 135 |
| No. C-HP | 99.9 | 88.1 | 73 |

From the results as illustrated in Table 3, it can readily be seen that Nos. 5 H and 6 H of this invention have a useful life of about 60% longer than the conventional material No. C-HP, thus showing that ceramic materials for high-speed cutting according to the invention can be usefully hot pressed.

While the invention has been described in detail and with reference to specific embodiments thereof, it will be apparent to one skilled in the art that various changes and modifications can be made therein without departing from the spirit and scope thereof.

What is claimed is:

1. A ceramic material for high-speed cutting consisting essentially of $Al_2O_3$, $ZrO_2$ and at least one alkaline earth metal oxide selected from the group consisting of CaO and MgO, wherein the weight ratio of $Al_2O_3/ZrO_2$ is in the range of from 95/5 to 99.5/0.5, the molar ratio of $(CaO+MgO)/ZrO_2$ is in the range of from 0.05/1 to 0.2/1, and at least 50% of the $ZrO_2$ in the material is cubic $ZrO_2$, and the remainder is monoclinic $ZrO_2$.

2. A ceramic material for high-speed cutting as in claim 1 wherein the alkaline earth metal oxide consists of CaO.

3. A ceramic material for high-speed cutting as in claim 1 wherein the alkaline earth metal oxide consists of MgO.

4. A ceramic material for high-speed cutting as in claim 1 wherein the weight ratio of $Al_2O_3/ZrO_2$ is in the range of from 97/3 to 98/2 and $(CaO+MgO)/ZrO_2$ is in the range of from 0.08/1 to 0.1/1.

* * * * *